Patented Sept. 18, 1945

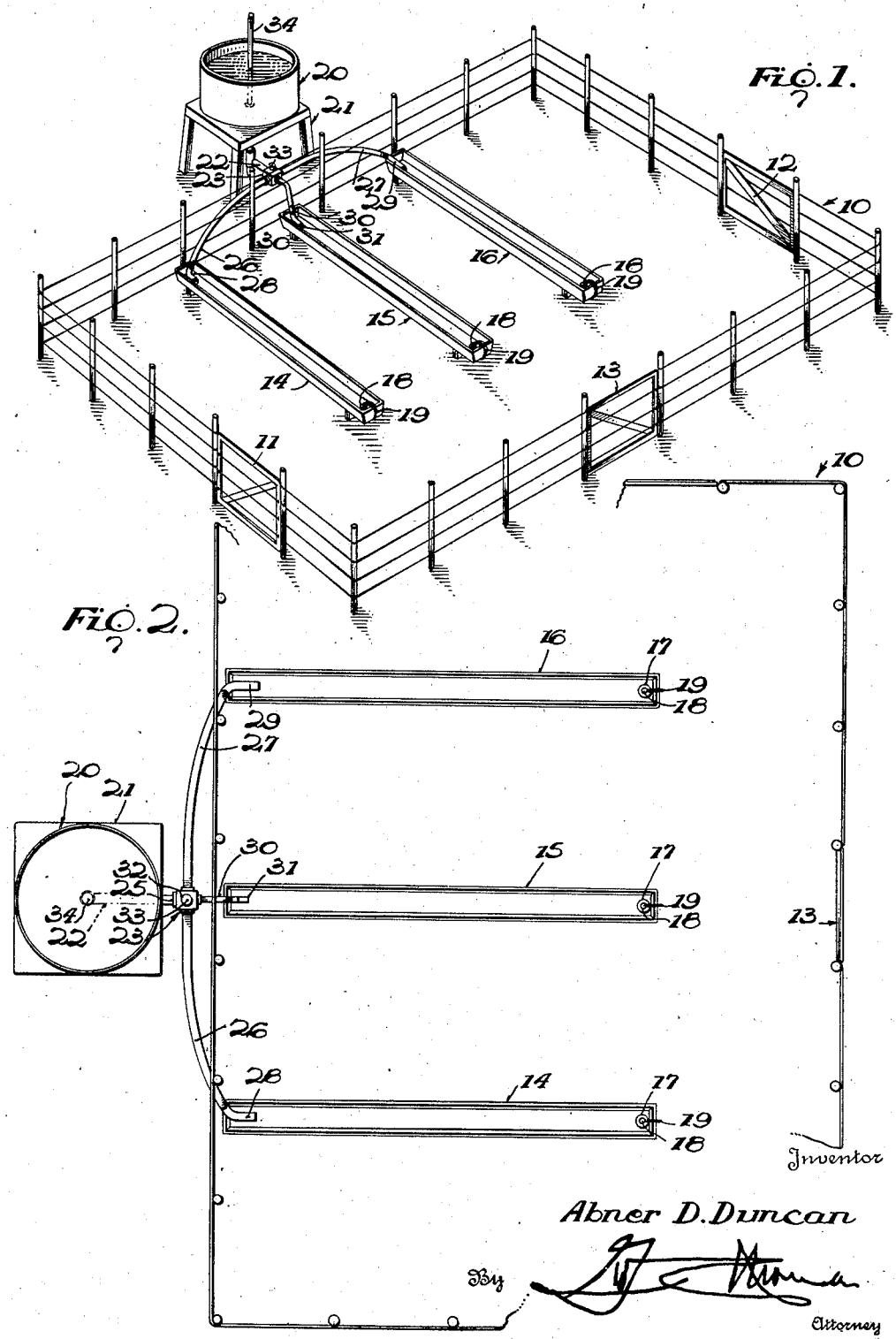

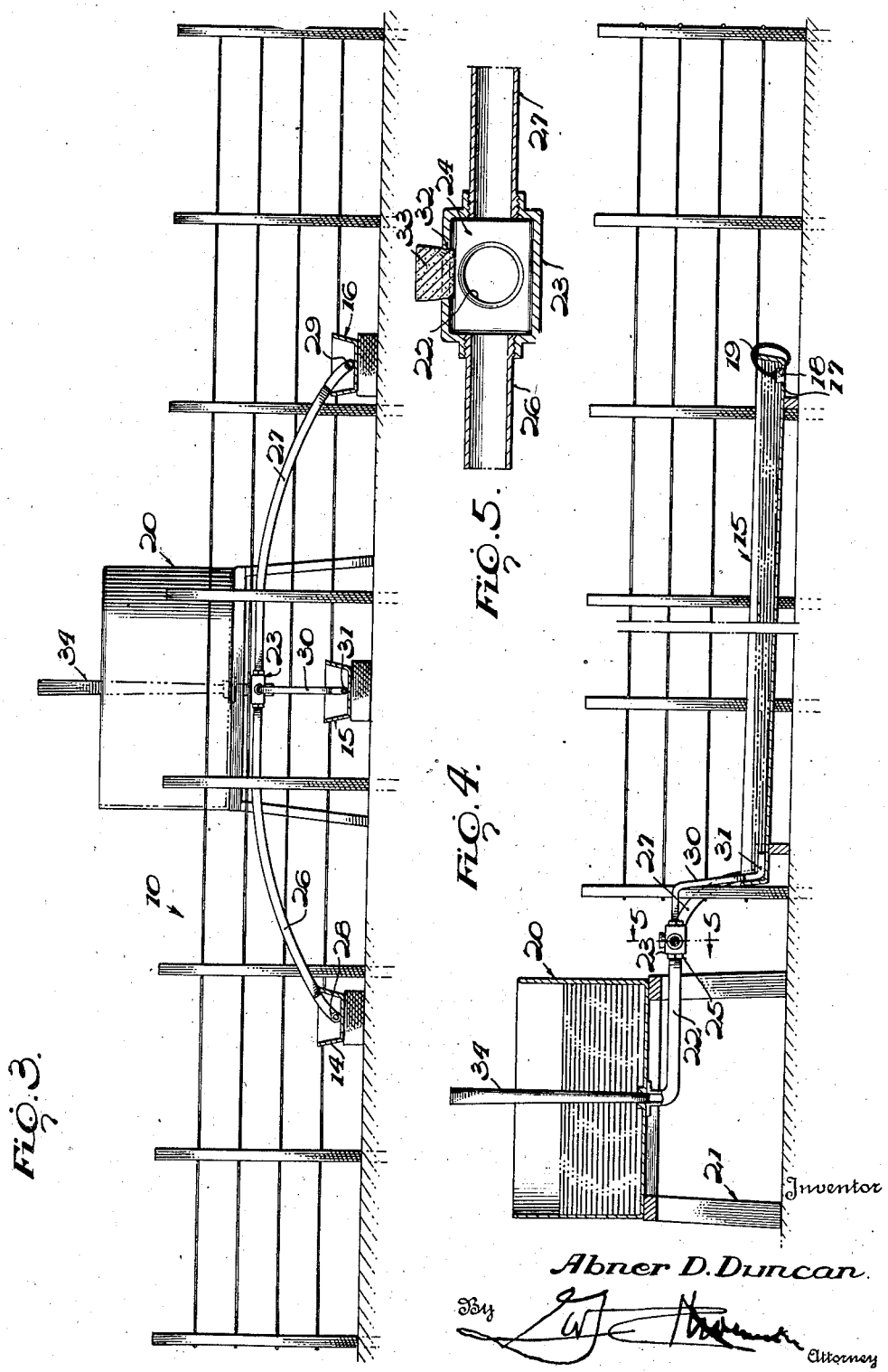

2,384,900

UNITED STATES PATENT OFFICE 2,384,900

LIVESTOCK FEEDING APPARATUS

Abner D. Duncan, Ponca City, Okla.

Application January 19, 1943, Serial No. 472,883

3 Claims. (Cl. 119—74)

This invention relates to an apparatus for feeding livestock.

One object of the invention is to provide an apparatus for feeding livestock embodying a trough located a distance from a point of feed supply and a liquid containing tank located at such source of supply a sufficient distance above the level of the trough to provide a gravity feed of the liquid to the trough through a pipe leading from the tank and coupled to a pipe carrying the liquid feed to the trough and discharging the liquid directly on the bottom of the trough to prevent splashing of the liquid feed as it enters the trough.

Another object of the invention is to provide a relatively large livestock feeding apparatus for the feeding of liquid food to large numbers of hogs at given periods and in which a plurality of spaced troughs located different distances from the source of supply are simultaneously supplied with the liquid food from the source of supply through distributing pipes and in such a manner as to insure a substantially uniform level of the liquid in the troughs.

Another object of the invention resides in the provision of a hog liquid feeding apparatus in which the hogs are confined within an enclosure during the feeding period and released therefrom after the feeding period.

A still further object of the invention resides in the provision of a relatively large enclosed hog liquid feeding plant or apparatus in which large numbers of hogs may be congregated and confined during the feeding period and in which the hogs partake of the liquid feed from a plurality of troughs arranged within the enclosure and supplied with the liquid from a tank outside of the enclosure through properly arranged pipe connections between the troughs and the tank.

With these and other objects in view, the invention consists in the novel construction, arrangement, and combination of parts hereinafter fully described, illustrated in the accompanying drawings, and pointed out in the claims hereto appended, it being understood that various changes in the form, proportion, and minor details of construction may be resorted to without departing from the spirit or sacrificing any of the advantages of the invention.

In the drawings:

Fig. 1 is a perspective view of the invention.

Fig. 2 is a top plan view of the invention, parts of the enclosure being broken away.

Fig. 3 illustrates the invention partly in elevation and partly in section.

Fig. 4 illustrates the invention partly in elevation and partly in section.

Fig. 5 is an enlarged fragmentary sectional view on the line 5—5 of Fig. 4.

Referring now more particularly to the accompanying drawings, the reference character 10 indicates, generally, a fence or enclosure of any suitable character and size adapted to confine a relatively large number of hogs within an enclosed area during feeding periods. To congregate the hogs quickly within the enclosed area at feeding time, there are provided gates 11, 12, and 13 through which hasty entrance can be made by the hogs, and a quick exit after the feeding period.

A plurality of feed troughs 14, 15, and 16 of any suitable length, say for instance twenty four feet, more or less, composed of any suitable material such as wood, metal or concrete, are arranged within the enclosed area in spaced apart parallel relation, preferably approximately eight feet apart and eight feet from the respective sides of the enclosure 10.

A drain opening 17 for drainage purposes is provided in one end of each trough and which openings, of course, are closed or plugged during the feeding period by any suitable type of removable closure. As shown, one type of closure is indicated as a plug 18 which may be carried by a chain, rope, or the like 19, secured to the respective trough, if desired, for the sake of ready accessibility and to prevent displacement thereof. The ends of the troughs are preferably parallel with relation to each other and each has its opposite sides preferably diverging upwardly and outwardly, as shown.

A source of swill or other feed supply employed in my method of feeding hogs is preferably in the nature of a tank 20. This tank may be composed of any suitable material and it may be of any suitable size, but preferably of a capacity of substantially five barrels of swill. This tank 20 is supported at an approximately three foot elevation above the ground outside of the enclosure 10, providing for gravity feed of liquid feed to the feed troughs. Any suitable supporting means, such as that indicated at 21, may be employed for the support of the tank 20.

A short outlet elbow or pipe 22 is fitted in and opens upwardly through the bottom of the tank at the center thereof. This pipe 22 extends downwardly from the bottom of the tank 20 and thence extends horizontally under the tank beyond the latter.

A pipe coupling 23 constructed to provide for an internal distributing chamber 24 has a suitable coupling connection 25 with the outer or terminal end of said elbow pipe 22, establishing communication between the tank 20 and the distributing chamber 24 and supporting the distributing chamber between the tank and the troughs.

Two downwardly curved, substantially one and one-half inch pipes 26 and 27 are coupled in any suitable manner to the opposite sides of the distributing chamber 24 to establish communication between the distributing chamber 24 and the troughs 14 and 16, there being elbows 28 and 29 connected to the free ends of the respective pipes 26 and 27 and lying in the respective troughs on the bottom thereof to discharge the liquid feed in a horizontal direction on the bottoms of the troughs to prevent splashing of the swill or other liquid feed as it enters the respective troughs from said distributing chamber by way of said pipes 26 and 27. The elbows 28 and 29 may be omitted by merely bending the free ends of the pipes to lie upon the bottoms of the troughs.

An intermediate one inch pipe 30 is coupled in any suitable manner to the distributing chamber 24 and depends therefrom into the intermediate trough 15 to convey the swill or other fluid from the distributing chamber 24 to the trough 15, there being a short elbow 31 on the free end of the intermediate pipe 30 which lies on the bottom of the intermediate trough 15 and which opens outwardly horizontally to prevent splashing of the feed as it enters the trough 15. The elbow 31 may be omitted and the free end of the pipe 30 bent to lie on the bottom of the trough 15.

Should the distributing chamber 24 or the pipes become clogged at any time, the clogging substance or material may be readily removed by hand or by use of a suitable implement operated through an opening 32, normally maintained tightly closed by a suitable stopper or plug 33 (see Fig. 5) or by means of any other suitable type of closure.

At the time of feeding livestock, the communication between the tank 20 and the elbow pipe 22 is closed in any suitable manner. One way in which this may be accomplished is to use a tapered stick or the like 34 shown in the tank 20, to plug said communication. The liquid swill or other feed material is then placed in the tank 20 through the upper open top in any suitable manner until the tank has received the desired quantity of liquid material. The hogs, if they have not already been let into the enclosure 10, may enter the enclosure when said stick 34 may be withdrawn from its closing relation with said communication between the tank 20 and the elbow pipe 22. The liquid, then under pressure of the liquid and gravity, flows through the elbow pipe 22 and the pipes 26, 27, and 30 to the respective troughs. The amount of supply of the liquid is regulated at periods by positioning of the stick, or the like, 34 in and out of the communication between the tank 20 and the elbow pipe 22, as will be well understood.

What is claimed is:

1. In an apparatus for feeding livestock including a plurality of spaced elongated, relatively narrow, shallow completely open top troughs located at a distance from a point of supply, a liquid feed containing tank at said point of supply located a sufficient distance above the level of the troughs to provide a gravity feed and having an outlet pipe extending from the lower portion thereof downwardly and thence horizontally under the tank and terminating beyond the tank, a distributing chamber secured to the outer terminal end of said pipe and supported thereby and with which said pipe communicates, and a plurality of liquid distributing pipes of less diameter than the diameter of said outlet pipe communicating with said distributing chamber and leading to the nearer ends of said troughs whereby to supply feed from the tank to the troughs.

2. In an apparatus for feeding livestock including a plurality of spaced elongated, relatively narrow completely open top troughs located at a distance from a point of supply, a liquid feed containing tank at said point of supply located a sufficient distance above the level of the troughs to provide a gravity feed and having an outlet pipe extending from the lower portion thereof downwardly and thence horizontally under the tank, a distributing chamber secured to the outer projecting terminal end of said pipe and supported thereby and with which said pipe communicates, and a plurality of liquid distributing pipes connected to and communicating with said distributing chamber and having their free ends deflected and lying directly upon the bottoms of said troughs at one end thereof to supply the liquid material to the troughs in a horizontal direction on the bottoms of the troughs so as to prevent splashing of the liquid feed as it enters the troughs.

3. In an apparatus for feeding livestock including a series of three substantially equi-distantly spaced, side by side parallel completely open-top troughs located at different distances from a point of supply, a liquid tank at said point of supply located a sufficient distance above the level of the troughs to provide a gravity feed and having an outlet pipe of uniform diameter extending downwardly and then horizontally from the lower portion thereof, a distributing chamber supported on said pipe and communicating therewith, oppositely arranged downwardly curved feed distributing pipes connected to and communicating with the distributing chamber and of less diameter than the diameter of said outlet pipe and at their free ends extending downwardly and lying directly upon the bottoms of the respective end troughs and opening outwardly horizontally to deliver the liquid feed to the troughs without splashing the feed as it enters the end troughs, and another distributing pipe connected to and communicating with the distributing chamber at a point between the points of said oppositely arranged distributing pipes and of less diameter than the diameter of the latter and at the free end thereof directed horizontally and opening horizontally into the intermediate trough to supply liquid feed to the intermediate trough directly upon the bottom of the intermediate trough to prevent splashing of the liquid feed as it enters the intermediate trough and whereby to cause a uniform feeding of the liquid to the troughs spaced different distances from the supply tank.

ABNER D. DUNCAN.